A. BADOWSKI.
TRANSPARENT CAP FOR TIRE STEM PRESSURE GAUGES.
APPLICATION FILED OCT. 19, 1921.

1,429,314.  Patented Sept. 19, 1922.

Alfred Badowski
Inventor:

By
Attorney

Patented Sept. 19, 1922.

1,429,314

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TRANSPARENT CAP FOR TIRE-STEM PRESSURE GAUGES.

Application filed October 19, 1921. Serial No. 508,737.

*To all whom it may concern:*

Be it known that I, ALFRED BADOWSKI, a citizen of the United States, residing at Charleston, in the county of Kanawha and State of West Virginia, have invented new and useful Improvements in Transparent Caps for Tire-Stem Pressure Gauges, of which the following is a specification.

It is desirable to provide tire stems in which are arranged pressure gauges with transparent caps. It is difficult to provide material having the transparent quality which may be directly attached to the tire stem. For this reason it is desirable to provide a metal base for such a cap and the present invention relates to a manner of mounting the transparent tube on the metal base to complete the cap.

The invention is illustrated in the accompanying drawings as follows:—

Figure 1:
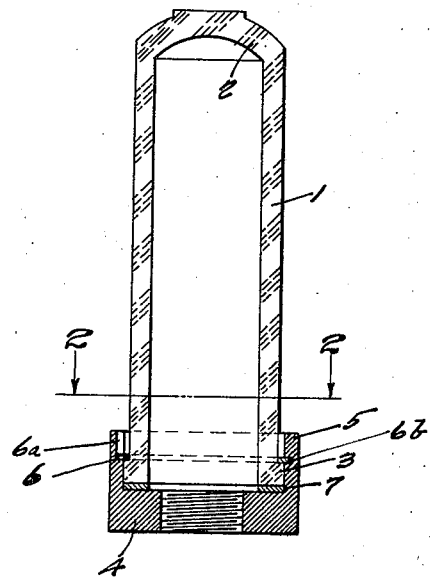

Fig. 1 shows a central vertical section of a transparent cap.

Figures 2, 3:
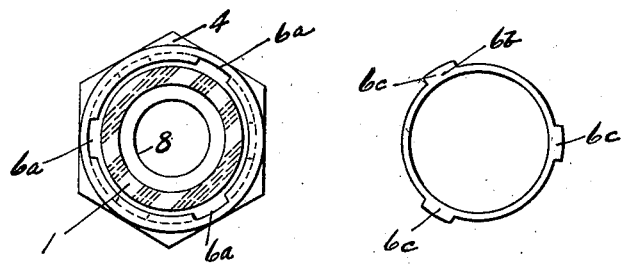

Fig. 2 a section on the line 2—2 in Fig. 1.

Fig. 3 a plan view of the locking ring.

1 marks the transparent tube, 2 a closure for the tube, 3 a shoulder arranged around the tube at its bottom, 4 a metal base, 5 an upwardly extending projection extending upwardly beyond the top of the shoulder 3, and 6 an annular groove in the extension, the upper wall of the groove being slightly above the upper face of the shoulder 3.

The projection 5 has a series of axially extending slots 6ᵃ extending from the top of the projection 5 into the groove 6.

The locking ring 6ᵇ is of a size to be slipped in between the upper part of the projection 5 and the tube 1, the locking ring having projections 6ᶜ which register with the slots 6ᵃ permitting the ring to be dropped down to place, the projections 6ᶜ passing through the slots 6ᵃ. The ring after it is dropped to position on the shoulder 3 is rotated bringing the projections 6ᶜ into the groove 6 and under the shoulder formed by the upper face of that groove. The ring is preferably formed of resilient metal and therefore yieldingly holds the cap in place on the base.

A washer 7 is preferably provided between the bottom of the tube 1 and the base 4. A screw-threaded opening 8 is arranged in the base 4 adapted to screw on to a tire stem permitting the pressure gauge to project into the transparent tube where it may be observed.

What I claim as new is:—

1. A transparent cap for tire stem pressure gauges comprising a transparent tube having a closure at the top and open at the bottom and having a shoulder at the bottom; a base having an upward projection overlapping the shoulder on the tube and having an undercut shoulder thereon, one of said shoulders having axial slots; and a locking ring having projections adapted to be inserted through said slots, said ring when turned relatively to said shoulders resting on the shoulder of the tube and under the shoulder on the projection of the base thus locking the tube in place on the base.

2. A transparent cap for tire stem pressure gauges comprising a transparent tube having a closure at the top and open at the bottom and having a shoulder at the bottom; a base having an upward projection overlapping the shoulder on the tube and having an undercut shoulder thereon, one of said shoulders having axial slots; and a resilient locking ring having projections adapted to be inserted through said slots, said ring when turned relatively to said shoulders resting on the shoulder of the tube and under the shoulder on the projection of the base thus locking the tube in place on the base.

3. A transparent cap for tire stem pressure gauges comprising a transparent tube having a closure at the top and open at the bottom and having a shoulder at the bottom; a base having an annular upward projection overlapping the shoulder and having an annular groove opposite the upper face of the shoulder and axial slots running from the top of the projection to the groove; and a locking ring adapted to be assembled by passing between the projection and the tube and having projections adapted to pass through said axial slots, said ring being adapted to be turned in the annular groove to rest on the shoulder of the tube and in the groove for locking the tube in place.

In testimony whereof I have hereunto set my hand.

ALFRED BADOWSKI.